United States Patent
Ata et al.

(10) Patent No.: US 12,266,199 B2
(45) Date of Patent: *Apr. 1, 2025

(54) INFERENCE DEVICE, INFERENCE METHOD, AND RECORDING MEDIUM

(71) Applicant: Mitsubishi Electric Corporation, Tokyo (JP)

(72) Inventors: Daiki Ata, Tokyo (JP); Daisuke Ammi, Tokyo (JP); Satoshi Namematsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/718,826

(22) PCT Filed: Feb. 15, 2022

(86) PCT No.: PCT/JP2022/006000
§ 371 (c)(1),
(2) Date: Jun. 12, 2024

(87) PCT Pub. No.: WO2023/157092
PCT Pub. Date: Aug. 24, 2023

(65) Prior Publication Data
US 2024/0420494 A1 Dec. 19, 2024

(51) Int. Cl.
*G06V 30/20* (2022.01)
*G06V 10/72* (2022.01)
*G06V 30/18* (2022.01)

(52) U.S. Cl.
CPC .............. *G06V 30/20* (2022.01); *G06V 10/72* (2022.01); *G06V 30/18029* (2022.01)

(58) Field of Classification Search
None
See application file for complete search history.

(56) References Cited

U.S. PATENT DOCUMENTS

| | | | |
|---|---|---|---|
| 11,710,210 B1* | 7/2023 | Medina, III | G06F 16/51 382/155 |
| 11,763,581 B1* | 9/2023 | Gangeh | G06F 40/40 382/181 |

(Continued)

FOREIGN PATENT DOCUMENTS

| | | |
|---|---|---|
| JP | 2004-362440 A | 12/2004 |
| JP | 2009-010853 A | 1/2009 |

(Continued)

OTHER PUBLICATIONS

International Search Report and Written Opinion mailed on May 17, 2022, received for International Application No. PCT/JP2022/006000, filed on Feb. 15, 2022, 9 pages including English Translation.

(Continued)

*Primary Examiner* — Soo Shin
(74) *Attorney, Agent, or Firm* — XSENSUS LLP

(57) ABSTRACT

An article image data acquirer acquires article image data as a target of optical character recognition (OCR). An inference result data generator generates first inference result data and second inference result data by inputting the article image data as the target of the OCR into a trained model. An inference result data outputter outputs the first inference result data and the second inference result data. An image filter generator generates a first image filter based on the first inference result data and a second image filter based on the second inference result data. An image filter outputter outputs the first image filter and the second image filter.

3 Claims, 12 Drawing Sheets

(56) References Cited

U.S. PATENT DOCUMENTS

| | | | |
|---|---|---|---|
| 12,086,530 B1* | 9/2024 | Smith | G06F 40/10 |
| 12,117,984 B1* | 10/2024 | Plumley | G06F 16/2228 |
| 12,118,809 B1* | 10/2024 | Ata | G06V 30/1916 |
| 2020/0302220 A1 | 9/2020 | Yamaguchi et al. | |
| 2023/0260305 A1* | 8/2023 | Sridharan | G06V 30/412 |
| | | | 382/209 |

FOREIGN PATENT DOCUMENTS

| | | |
|---|---|---|
| JP | 2009-282940 A | 12/2009 |
| JP | 2010-157118 A | 7/2010 |
| JP | 2020-144735 A | 9/2020 |
| JP | 2020-154600 A | 9/2020 |

OTHER PUBLICATIONS

Notice of Allowance mailed on Sep. 27, 2022, received for JP Application No. 2022-547921, 5 pages including English Translation.

\* cited by examiner

FIG.5

| PROBABILITY OF IMAGES BEING CAPTURED | 9% | | 60% | | 30% | | 1% | | |
|---|---|---|---|---|---|---|---|---|---|
| ARTICLE IMAGE DATA / IMAGE-FILTER-RELATED DATA | IMG-1 | ORDER | IMG-2 | ORDER | IMG-3 | ORDER | IMG-4 | ORDER | EXPECTED VALUE |
| F/P-001 | 99 | 1 | 70 | 3 | 60 | 4 | 20 | 5 | — |
| F/P-002 | 60 | 3 | 10 | 5 | 100 | 1 | 91 | 1 | — |
| F/P-003 | 20 | 4 | 98 | 1 | 91 | 2 | 80 | 4 | — |
| F/P-004 | 80 | 2 | 81 | 2 | 82 | 3 | 82 | 3 | — |
| F/P-005 | 0 | 5 | 11 | 4 | 20 | 5 | 91 | 1 | — |
| F/P-001,002 (FIRST CANDIDATE) | 99 | 1 | 70 | 3 | 100 | 1 | 91 | 1 | 81.82 |
| F/P-001,003 (SECOND CANDIDATE) | 99 | 1 | 98 | 1 | 91 | 2 | 80 | 4 | 95.81 |

INFERENCE DEVICE, INFERENCE METHOD, AND RECORDING MEDIUM

CROSS-REFERENCE TO RELATED APPLICATION

This application is a national stage application, pursuant to 35 U.S.C. § 371, of International Patent Application No. PCT/JP2022/006000, filed Feb. 15, 2022, the entire contents of which are incorporated herein by reference.

TECHNICAL FIELD

The present disclosure relates to an image filter generation system, an image filter generation device, an inference device, an inference method, and a program.

BACKGROUND ART

In optical character recognition or an optical character reader (OCR) that recognizes characters written on an article captured in an image by an imaging component, devices trained through machine learning have been used in image processing of a captured image of the article.

Patent Literature 1 describes an image processing device that uses a neural network as an order planner that outputs an order plan of an image conversion filter to be used in image processing. In Patent Literature 1, a learning controller trains the neural network with a group of training data pairs that are pairs of training images and order patterns that can be acquired by combining a group of image conversion filters. More specifically, the learning controller inputs the training images included in the training data pairs into the neural network, and feeds losses that are errors calculated from output order plans and the order patterns included in the training data pairs back to the neural network to train the neural network.

Patent Literature 2 describes an image correction device that generates an appropriate image for an input image. In Patent Literature 2, a statistical learning rule is constructed through learning of, as a ground truth value, a parameter of a spatial filter that forms a small area image divided from a sample image into an appropriate image. In Patent Literature 2, the small area image is corrected using a spatial filter created based on the parameter output based on pixel values of pixels included in the small area image acquired by dividing an input image input into the statistical learning rule.

CITATION LIST

Patent Literature

Patent Literature 1: Unexamined Japanese Patent Application Publication No. 2020-154600
Patent Literature 2: Unexamined Japanese Patent Application Publication No. 2009-10853

SUMMARY OF INVENTION

Technical Problem

The devices described in Patent Literatures 1 and 2 simply infer one combination of image filters and parameters that is optimum for image processing of an input image. Thus, the devices described in Patent Literatures 1 and 2 may not be responsive to environmental fluctuations that can occur in the actual operation of OCR, such as light coming in through a factory window during morning and evening hours, misalignment of the position, orientation, or rotation angle of a workpiece as a target of image capturing, and differences between individual workpieces, and may thus misrecognize characters.

In response to the above circumstances, an objective of the present disclosure is to reduce misrecognition of characters.

Solution to Problem

To achieve the above objective, an image filter generation system according to the present disclosure generates image filters usable for image processing to be performed before performance of OCR on article image data that is data of an image of an article captured by an imaging component. The OCR is optical character recognition. The image filter generation system includes an image filter generation device to generate the image filters, a learning device to learn a relationship between the article image data acquired in advance and the image filters used for image processing of the article image data, and an inference device to infer the image filters usable for image processing of the article image data as a target of the OCR. The learning device includes a training data acquirer to acquire training data including (i) the article image data and (ii) image-filter-related data indicating a combination of a plurality of image filters used for image processing of the article image data and a value of a parameter for each of the plurality of image filters, a trained model generator to generate a trained model indicating a relationship between the article image data and the image-filter-related data through machine learning using the training data, and a trained model outputter to output the trained model. The inference device includes an article image data acquirer to acquire the article image data as the target of the OCR, an inference result data generator to generate, by inputting the article image data as the target of the OCR into the trained model, inference result data indicating a combination of a plurality of image filters usable for image processing of the article image data as the target of the OCR and a value of a parameter for each of the plurality of image filters, the inference result data generator being to generate first inference result data as the inference result data and second inference result data as the inference result data different from the first inference result data, and an inference result data outputter to output the first inference result data and the second inference result data. The image filter generation device includes an image filter generator, a second image filter generator, and an image filter outputter. The first filter generator generates a first image filter based on the first inference result data. The second image filter generator generates a second image filter based on the second inference result data. The first image filter and the second image filter are the image filters. The image filter outputter outputs the first image filter and the second image filter.

Advantageous Effects of Invention

According to the present disclosure, the inference device generates and outputs the first inference result data and the second inference result data, and the image filter generation device generates and outputs the first image filter and the second image filter. This allows a user to perform image processing of the article image data using one of the first image filter or the second image filter and select the image filter with the highest character recognition score when performing OCR. The image filter generation system according to the present disclosure can thus reduce misrecognition of characters more than an image filter generation system that does not generate first inference result data nor second inference result data.

BRIEF DESCRIPTION OF DRAWINGS

FIG. 5 is a table describing an overview of a process for outputting inference result data in Embodiment 1;

DESCRIPTION OF EMBODIMENTS

Figure 1:
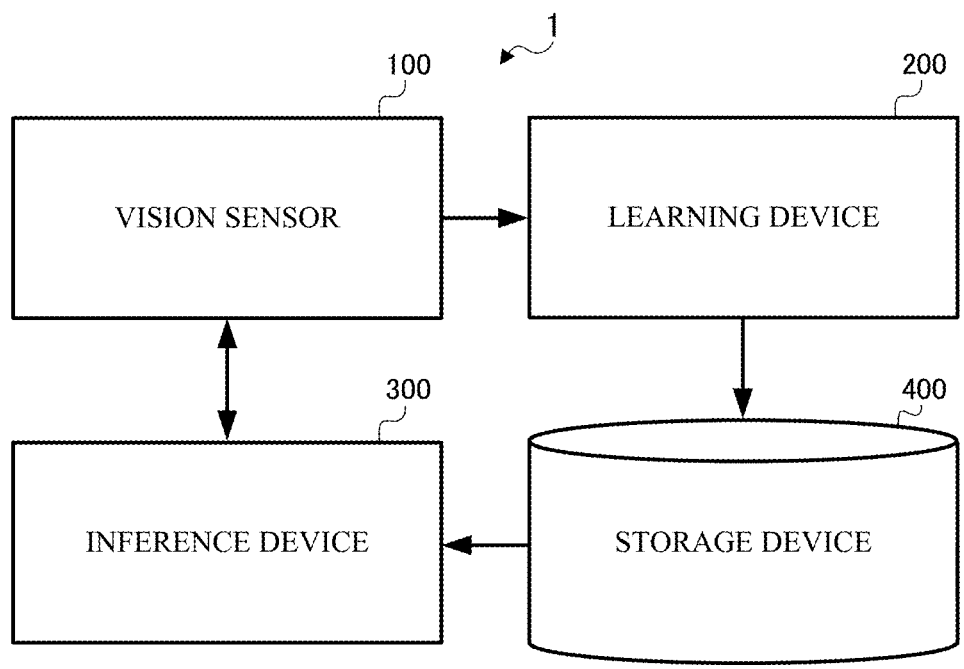
FIG. 1 is a diagram of an image filter generation system according to Embodiment 1, illustrating an overall configuration.

An image filter generation system, an image filter generation device, an inference device, an inference method, and a program according to one or more embodiments of the present disclosure are described in detail with reference to the drawings. Like reference signs denote like or corresponding components in the drawings.

Embodiment 1

Image Filter Generation System 1 according to Embodiment 1 An image filter generation system 1 according to Embodiment 1 of the present disclosure generates image filters usable for image processing to be performed before performance of optical character recognition or an optical character reader (OCR) on data of captured images of workpieces, such as products and components produced in a factory.

As illustrated in FIG. 1, the image filter generation system 1 includes a vision sensor 100 that is an example of an imaging device and an example of an image filter generation device that generates image filters usable for image processing of data of a captured image. The image filter generation system 1 includes a learning device 200 that learns the relationship between article image data being image data of an article acquired in advance and image filters used for image processing performed before performance OCR on the article image data. The image filter generation system 1 includes an inference device 300 that infers the image filters usable for image processing of the article image data as a target of OCR. The image filter generation system 1 also includes a storage device 400 that stores data. The vision sensor 100, the learning device 200, the inference device 300, and the storage device 400 can transmit and receive data through a local area network (LAN) not illustrated.

The image filter generation system 1 first performs image processing of article image data acquired through image capturing by the vision sensor 100 in advance using an image filter generated in advance, and performs trial OCR on the article image data. The vision sensor 100 outputs, to the learning device 200, training data based on the results of the trial OCR performed on the article image data. The learning device 200 generates a trained model through machine learning using the acquired training data. The learning device 200 outputs the generated trained model to the storage device 400 and stores the trained model into the storage device 400. The inference device 300 acquires the trained model stored in the storage device 400.

The vision sensor 100 outputs article image data to the inference device 300 when actually performs image capturing of an article as the target of OCR. The inference device 300 inputs the acquired article image data into the trained model, generates inference result data indicating the inference result of an image filter usable for image processing of the article image data, and outputs the inference result data to the vision sensor 100. The vision sensor 100 then generates an image filter based on the acquired inference result data, performs image processing of the article image data using the generated image filter, and performs OCR.

Vision Sensor 100 According to Embodiment 1

Figure 2:
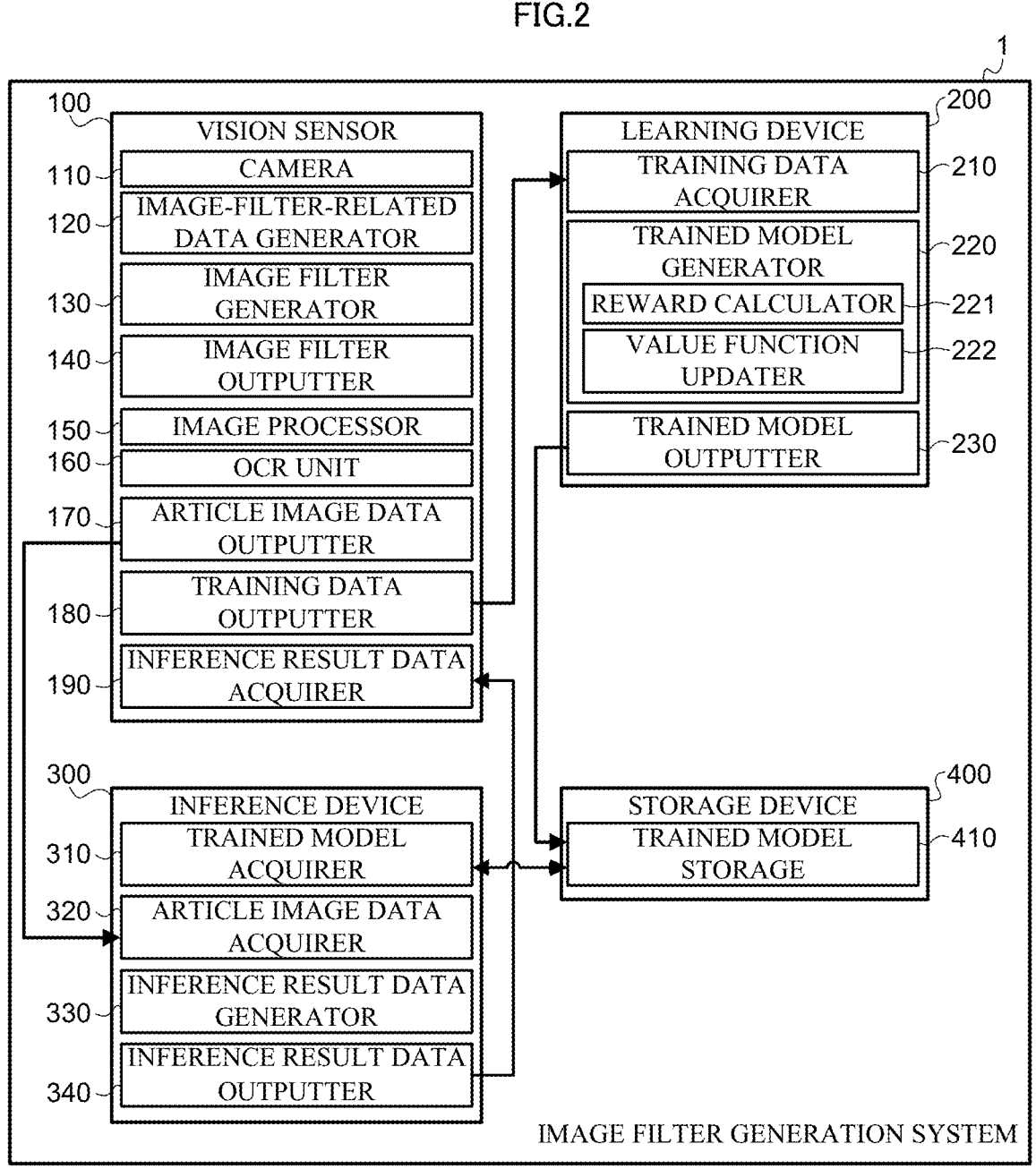
FIG. 2 is a functional block diagram of the image filter generation system according to Embodiment 1.

As illustrated in FIG. 2, the vision sensor 100 includes a camera 110 as an example of an imaging component that performs image capturing of an article. The vision sensor 100 includes an image-filter-related data generator 120 that generates image-filter-related data indicating combinations of multiple types of image filters and the parameters of the image filters. The vision sensor 100 includes an image filter generator 130 that generates image filters, an image filter outputter 140 that outputs the image filters, an image processor 150 that performs image processing, and an OCR unit 160 that performs OCR. The vision sensor 100 includes an article image data outputter 170 that outputs article image data, a training data outputter 180 that outputs training data, and an inference result data acquirer 190 that acquires inference result data.

Learning Device 200 According to Embodiment 1

The learning device 200 is a computer such as a personal computer, a server computer, or a supercomputer. The learning device 200 includes a training data acquirer 210 that acquires the training data, a trained model generator 220 that generates a trained model, and a trained model outputter 230 that outputs the trained model. The trained model generator 220 includes a reward calculator 221 that calculates a reward (described later), and a value function updater 222 that updates a value function (described later).

Inference Device 300 According to Embodiment 1

The inference device 300 is a computer similar to the learning device 200. The inference device 300 includes a trained model acquirer 310 that acquires the trained model, an article image data acquirer 320 that acquires the article image data, an inference result data generator 330 that generates the inference result data, and an inference result data outputter 340 that outputs the inference result data.

Storage Device 400 in Embodiment 1

The storage device 400 is, for example, a hard disk drive (HDD) on a communication network connected with the LAN, or a network attached storage (NAS). The storage device 400 includes a trained model storage 410 that stores the trained model.

Hardware Configuration of Learning Device 200 in Embodiment 1

Figure 3:
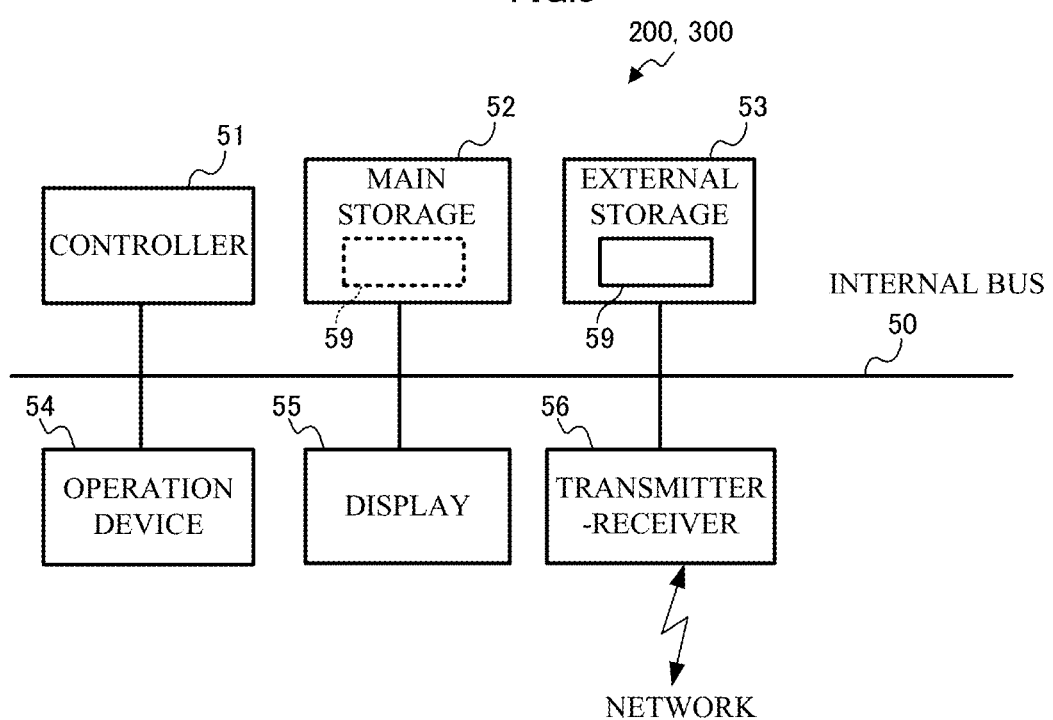
FIG. 3 is a block diagram of each device in Embodiment 1, illustrating the hardware configuration.

As illustrated in FIG. 3, the learning device 200 includes a controller 51 that performs processing in accordance with a control program 59. The controller 51 includes a central processing unit (CPU). The controller 51 functions as the trained model generator 220, the reward calculator 221, and the value function updater 222 illustrated in FIG. 2 in accordance with the control program 59.

Referring back to FIG. 3, the learning device 200 includes a main storage 52 into which the control program 59 is loaded. The main storage 52 is used as a work area for the controller 51. The main storage 52 includes a random-access memory (RAM).

The learning device 200 also includes an external storage 53 that prestores the control program 59. The external storage 53 provides data stored in the program to the controller 51 in response to an instruction from the controller 51, and stores data provided from the controller 51. The external storage 53 includes a nonvolatile memory such as a flash memory, an HDD, or a solid-state dive (SSD).

The learning device 200 also includes an operation device 54 operable by a user. Information input with the operation device 54 is provided to the controller 51. The operation device 54 includes information input components such as a keyboard, a mouse, and a touchscreen.

The learning device 200 includes a display 55 that displays information input with the operation device 54 and information output from the controller 51. The display 55 includes a display device such as a liquid crystal display (LCD) or an organic electroluminescent (EL) display.

Referring back to FIG. 3, the learning device 200 includes a transmitter-receiver 56 that transmits and receives information. The transmitter-receiver 56 includes information communication components such as a communication network termination device or a wireless communication device connected to a network. The transmitter-receiver 56 functions as the training data acquirer 210 and the trained model outputter 230 illustrated in FIG. 2.

Referring back to FIG. 3, in the learning device 200, the main storage 52, the external storage 53, the operation device 54, the display 55, and the transmitter-receiver 56 are connected to the controller 51 with an internal bus 50.

The learning device 200 implements the functions of the above components 210, 220 to 222, and 230 illustrated in FIG. 2 with the controller 51 using the main storage 52, the external storage 53, the operation device 54, the display 55, and the transmitter-receiver 56 as resources. For example, the learning device 200 performs a training data acquisition step with the training data acquirer 210. For example, the learning device 200 performs a trained model generation step with the trained model generator 220, a reward calculation step with the reward calculator 221, and a value function update step with the value function updater 222. For example, the learning device 200 performs a trained model output step with the trained model outputter 230.

Hardware Configuration of Inference Device 300 According to Embodiment 1

Similarly to the learning device 200, the inference device 300 includes a controller 51, a main storage 52, an external storage 53, an operation device 54, a display 55, and a transmitter-receiver 56 as illustrated in FIG. 3. The controller 51 functions as the inference result data generator 330 illustrated in FIG. 2 in accordance with the control program 59. The transmitter-receiver 56 functions as the trained model acquirer 310, the article image data acquirer 320, and the inference result data outputter 340 illustrated in FIG. 2.

Referring back to FIG. 3, the inference device 300 implements the functions of the above components 310 to 330 illustrated in FIG. 2 with the controller 51 using the main storage 52, the external storage 53, the operation device 54, the display 55, and the transmitter-receiver 56 as resources. For example, the inference device 300 performs a trained model acquisition step with the trained model acquirer 310, an article image data acquisition step with the article image data acquirer 320, an inference result data generation step with the inference result data generator 330, and an inference result data output step with the inference result data outputter 340.

Hardware Configuration of Vision Sensor 100 According to Embodiment 1

Although not illustrated, the vision sensor 100 includes a controller 51, a main storage 52, an external storage 53, an operation device 54, and a transmitter-receiver 56. The controller 51 functions as the image-filter-related data generator 120, the image filter generator 130, the image filter outputter 140, the image processor 150, and the OCR unit 160 illustrated in FIG. 2 in accordance with the control program 59. The transmitter-receiver 56 functions as the article image data outputter 170, the training data outputter 180, and the inference result data acquirer 190 illustrated in FIG. 2.

Referring back to FIG. 3, the vision sensor 100 implements the functions of the above components 120 to 190 illustrated in FIG. 2 with the controller 51 using the main storage 52, the external storage 53, the operation device 54, and the transmitter-receiver 56 as resources. For example, the vision sensor 100 performs an image-filter-related data generation step with the image-filter-related data generator 120, an image filter generation step with the image filter generator 130, and an image filter output step with the image filter outputter 140. For example, the vision sensor 100 performs an image processing step with the image processor 150 and an OCR step with the OCR unit 160. For example, the vision sensor 100 performs an article image data output step with the article image data outputter 170, a training data output step with the training data outputter 180, and an inference result data acquisition step with the inference result data acquirer 190.

Details of Functional Components of Vision Sensor 100 According to Embodiment 1

Referring back to FIG. 2, the camera 110 images a workpiece, as an example of an article, within a predetermined design value tolerance, or more specifically, performs image capturing of an acceptable workpiece, and generates article image data. The camera 110 may perform image capturing of a workpiece being conveyed on an actual production line during manufacture, image capturing of a workpiece being conveyed on a production line similar to the actual production line, or image capturing of a workpiece in a pseudo environment simulating the environment during manufacture. When performing image capturing of a workpiece in the pseudo environment, for example, the camera 110 may generate multiple types of article image data by performing image capturing of the workpiece multiple times in simulations of environmental fluctuations expected during manufacture, or more specifically, time zones such as morning, daytime, and evening, and the orientation and rotation angle of the workpiece being conveyed.

The image-filter-related data generator 120 generates image-filter-related data of image filters usable for image processing when trial OCR is performed on article image data acquired from the camera 110 in advance. The article image data as the target of trial OCR includes article image data of the workpiece actually captured in an image at a time during past manufacture and article image data of the workpiece captured in an image in the pseudo environment described above. A combination of multiple types of image filters indicated by the image-filter-related data is, for example, a combination of image filters selected from known image filters such as binarization, expansion, contraction, smoothing filters, noise reduction filters, contour extraction filters, high-pass filters, low-pass filters, clips, and edge enhancement filters. The parameters of the image filters indicated by the image-filter-related data are combinations of the values of multiple types of parameters selected from known parameters such as thresholds, kernel sizes, gains, maximum values, and minimum values.

The image-filter-related data generator 120 may generate image-filter-related data from, for example, an image filter actually used in past manufacture. The image-filter-related data generator 120 may generate image-filter-related data by, for example, selecting a combination of image filters and the parameters of the image filters using random numbers.

The image filter generator 130 generates an image filter based on the image-filter-related data. For example, the image-filter-related data indicates a combination of a noise reduction filter and a contour extraction filter, with the parameters of the noise reduction filter being first parameters and the parameters of the contour extraction filter being second parameters. In this case, the image filter generator 130 generates an image filter that combines the noise reduction filter with the first parameters and the contour extraction filter with the second parameters.

When the image filter generator 130 generates an image filter, the image filter outputter 140 outputs the generated image filter to the image processor 150.

The image processor 150 performs image processing of the article image data using the image filter acquired from the image filter outputter 140.

The OCR unit 160 performs OCR on the article image data that has undergone the image processing, and outputs a score that is a value indicating the reliability of character recognition.

The article image data outputter 170 outputs, to the inference device 300, the article image data as the target of OCR that is acquired from the camera 110.

The training data outputter 180 outputs training data to the learning device 200. The training data includes the article image data that has undergone trial OCR and the image-filter-related data that can identify the image filter used for image processing of the article image data. The training data further includes OCR score data indicating the score output by performing trial OCR after performing image processing of the article image data using the image filter based on the image-filter-related data. The training data thus includes the article image data, the image-filter-related data, and the OCR score data about workpieces during past manufacture.

Figure 4:
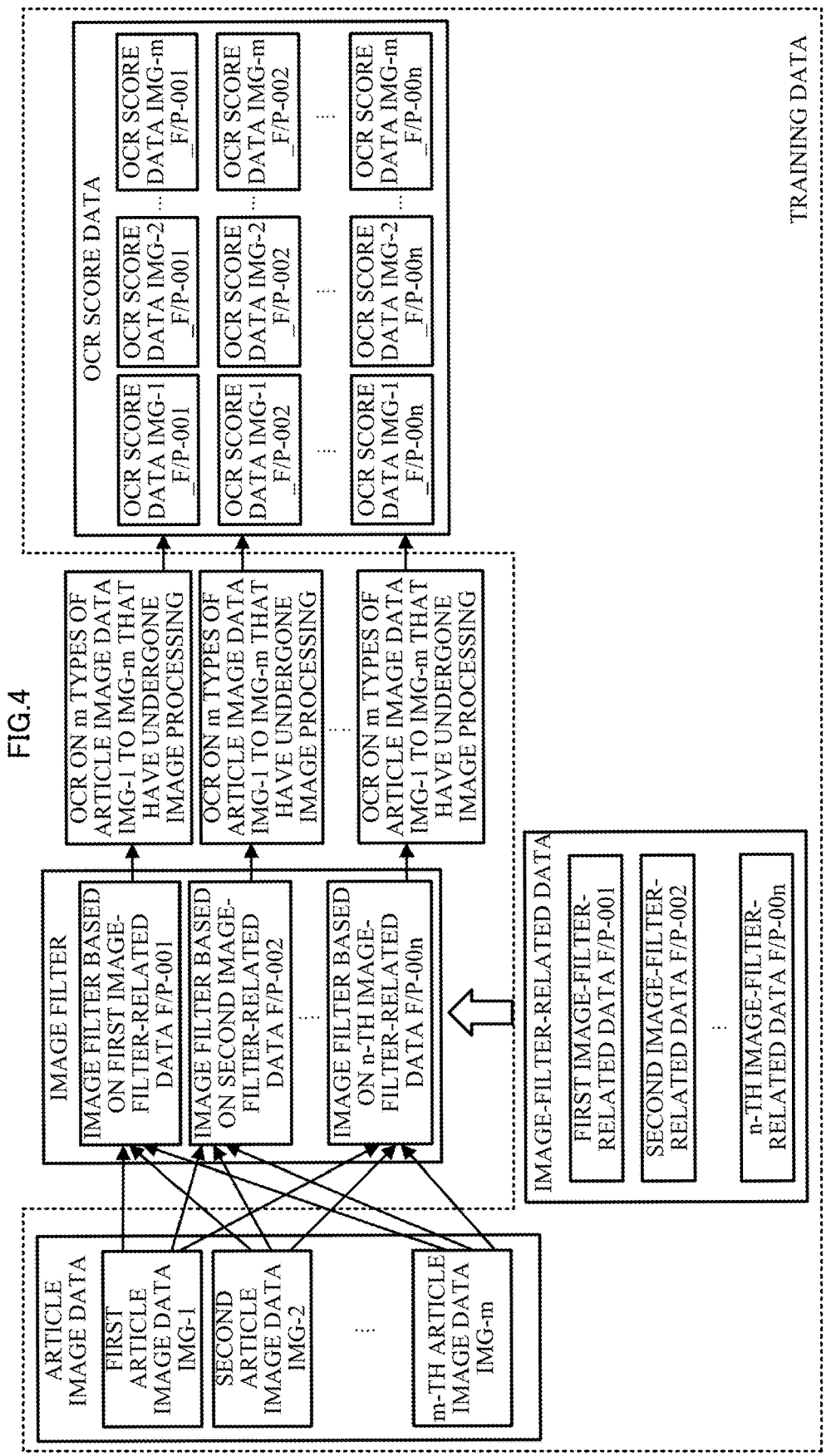
FIG. 4 is a diagram describing training data in Embodiment 1.

A process performed by the vision sensor 100 to generate training data to cause the training data outputter 180 to output the training data to the learning device 200 is described. As illustrated in FIG. 4, the camera 110 generates m types of article image data IMG-1, IMG-2, ..., IMG-m, where m is a natural number. The image-filter-related data generator 120 generates n types of image-filter-related data F/P-001, F/P-002, ..., F/P-00n, where n is a natural number. The image filter generator 130 generates n image filters based on the n types of image-filter-related data F/P-001, F/P-002, ..., F/P-00n. The image processor 150 performs image processing of each set of article image data IMG-1, IMG-2, ..., IMG-m using then image filters. The OCR unit 160 performs OCR m×n types of article image data that has undergone the image processing and outputs m×n types of OCR score data.

The OCR score data pieces of the first article image data IMG-1 that has undergone image processing and OCR using the image filters based on the image-filter-related data F/P-001, F/P-002, ..., F/P-00n are respectively denoted with IMG-1_F/P-001, IMG-1_F/P-002, ..., IMG-1_F/P-00n. The OCR score data pieces of the second article image data IMG-2 that has undergone image processing and OCR using the image filters based on the image-filter-related data F/P-001, F/P-002, ..., F/P-00n are respectively denoted with IMG-2_F/P-001, IMG-2_F/P-002, ..., IMG-2_F/P-00n. The OCR score data pieces of the m-th article image data IMG-m that has undergone image processing and OCR using the image filters based on the image-filter-related data F/P-001, F/P-002, ..., F/P-00n are respectively denoted with IMG-m_F/P-001, IMG-m_F/P-002, ..., IMG-m_F/P-00n.

The training data outputter 180 thus outputs, as training data, data including the m types of article image data IMG-1, IMG-2, ..., IMG-m, the n types of image-filter-related data F/P-001, F/P-002, ..., F/P-00n, and the m×n types of OCR score data IMG-1_F/P-001, IMG-1_F/P-002, ..., IMG-1_F/P-00n, IMG-2_F/P-001, IMG-2_F/P-002, ..., IMG-2_F/P-00n, ..., IMG-m_F/P-001, IMG-m_F/P-002, ..., IMG-m_F/P-00n.

Referring back to FIG. 2, the inference result data acquirer 190 acquires the inference result data output from the inference device 300. The image filter generator 130 generates an image filter based on the inference result data. The image filter outputter 140 outputs the image filter to the image processor 150. The image processor 150 performs image processing of the article image data using the acquired image filter. The OCR unit 160 performs OCR on the article image data that has undergone the image processing.

Details of Functional Components of Learning Device 200 in Embodiment 1

The training data acquirer 210 acquires the training data output from the vision sensor 100. For example, the training data acquirer 210 acquires, as training data, the data including the m types of article image data IMG-1, IMG-2, ..., IMG-m, the n types of image-filter-related data F/P-001, F/P-002, ..., F/P-00n, and the m×n types of OCR score data IMG-1_F/P-001, IMG-1_F/P-002, ..., IMG-1_F/P-00n, IMG-2_F/P-001, IMG-2_F/P-002, ..., IMG-2_F/P-00n, ..., IMG-m_F/P-001, IMG-m_F/P-002, ..., IMG-m_F/P-00n.

The trained model generator 220 generates a trained model indicating the relationship between the article image data, the image-filter-related data, and the OCR score data through machine learning using the acquired multiple types of training data. The trained model generator 220 generates a trained model through Q-learning, serving as an example of an algorithm of reinforcement learning known as an example of machine learning. Reinforcement learning is machine learning in which an agent, or an entity that takes an action, in a certain environment determines an action to be taken through observation of the current state or the environmental parameters. In reinforcement learning, an environment dynamically changes with actions taken by the agent, and the agent receives a reward based on the environmental change. In reinforcement learning, the agent repeats the above operations and learns an action policy that maximizes the reward through a series of actions.

In Q-learning, an action value based on an action value function as an example of a value function is calculated as an action policy that maximizes the reward. When the environmental state at a time t is denoted with $s_t$, an action at the time t is denoted with $a_t$, a state changed by the action $a_t$ is denoted with $s_{t+1}$, a reward acquired by changing the state from $s_t$ to $s_{t+1}$ is denoted with $r_{t+1}$, a discount rate is denoted with γ, and a learning coefficient is denoted with α, 0<γ≤1 and 0<α≤1. When the action value function is $Q(s_t, a_t)$, the general update formula of the action value function $Q(s_t, a_t)$ is expressed with Formula 1 below.

$$Q(s_t,a_t) \leftarrow Q(s_t,a_t)+\alpha(r_{t+1}+\gamma_{max}Q(s_{t+1},a)-Q(s_t,a_t)) \quad \text{Formula 1}$$

In Q-learning, with the action value denoted with Q, the action value Q is increased when the action value Q of the most valuable action $a_{t+1}$ at a time t+1 is higher than the action value Q of the action taken at the time t, and the action value Q is decreased when the action value Q of the action $a_{t+1}$ is lower than the action value Q of the action $a_t$. In other words, in Q-learning, the action value function $Q(s_t, a_t)$ is updated to approximate the action value Q of the action at the time t to the optimal action value at the time t+1. Thus, the optimal action value Q in a certain environment is sequentially propagated to the action value Q in the previous environment.

The trained model generator 220 applies a value based on the article image data included in the training data to the state $s_t$, and applies a value based on the image-filter-related data included in the training data to the action $a_t$ to generate a trained model through Q-learning. The values based on the article image data may be used for the state $s_t$ with any method. For example, a numerical value indicating the article image data is denoted with x, and a predetermined constant is denoted with u. The state $s_t$ may be $s_t$=u×x.

The values based on the image-filter-related data may be used for the action $a_t$ with any method when the action $a_t$ can be calculated based on the action value function $Q(s_t, a_t)$ and the state $s_t$, and the combination of the image filters and the parameters of the image filters can be identified based on the action $a_t$. For example, a numerical value indicating the image-filter-related data is denoted with y, and a predetermined constant is denoted with v. The action $a_t$ may be $a_t$=v×y.

The reward calculator 221 calculates a reward $r_{t+1}$ based on a numerical value indicating the article image data included in the training data, a numerical value indicating the image-filter-related data, and a score value based on the OCR score data. For example, the reward calculator 221 changes the reward $r_{t+1}$ to be provided when the score value based on the OCR score data changes as at least one of the numerical value indicating the article image data or the numerical value indicating the image-filter-related data changes in comparing two types of training data. More specifically, when the score value increases, the reward calculator 221 increases the reward $r_{t+1}$, and provides a reward of, for example, +1. When the score value decreases, the reward calculator 221 decreases the reward $r_{t+1}$, and provides a reward of, for example, −1.

For example, the first article image data IMG-1 and two types of image-filter-related data F/P-001 and F/P-002 are described. In this case, the numerical values indicating the image-filter-related data F/P-001 and F/P-002 are different, and the score values based on the OCR score data IMG-1_F/P-001 and IMG-1_F/P-002 are thus also different. When the score values based on the OCR score data IMG-1_F/P-001 and IMG-1_F/P-002 are respectively denoted with SC1 and SC2, the reward calculator 221 provides a reward of +1 when the image-filter-related data changes from F/P-001 to F/P-002 and (SC2−SC1)>0, and provides a reward of −1 when (SC2−SC1)≤0.

The value function updater 222 updates the action value function $Q(s_t, a_t)$ based on the reward $r_{t+1}$ calculated by the reward calculator 221. The value function updater 222 also generates data indicating the action value function $Q(s_t, a_t)$ as a trained model.

Every when the training data acquirer 210 acquires training data from the vision sensor 100, the trained model generator 220 repeatedly calculates the reward $r_{t+1}$ and updates the action value function $Q(s_t, a_t)$. Every when updating the action value function $Q(s_t, a_t)$ with the update formula expressed with Formula 1 above, the trained model generator 220 generates data indicating the updated action value function $Q(s_t, a_t)$ as a trained model.

The trained model outputter 230 outputs the generated trained model, or in other words, the data indicating the action value function $Q(s_t, a_t)$, to the storage device 400 and stores the data into the storage device 400.

Details of Functional Components of Inference Device 300 According to Embodiment 1

The trained model acquirer 310 acquires the trained model stored in the storage device 400.

The article image data acquirer 320 acquires the article image data as the target of OCR that is output from the vision sensor 100. In the present embodiment, the article image data as the target of OCR that is acquired by the article image data acquirer 320 is the article image data of workpieces captured in an image in advance on the actual production line before performance of OCR in the vision sensor 100. More specifically, the article image data as the target of OCR includes multiple types of article image data as the target of image processing, such as article image data of a workpiece on which characters are blurred, article image data of a workpiece captured in an image in a bright room, and article image data of a workpiece captured in an image in a dark room. The article image data as the target of image processing may include data indicating the probability of the images being captured in an image on the actual production line.

The inference result data generator 330 generates inference result data by inputting the article image data as the target of OCR into the trained model. The inference result data generator 330 generates first inference result data that is the inference result data and second inference result data that is the inference result data different from the first inference result data.

An overview of a process in which the trained model that has received the article image data as the target of OCR outputs the first inference result data and the second inference result data is described. The learning device 200 may use, for machine learning, training data including four types of article image data IMG-1, IMG-2, IMG-3, and IMG-4, five types of image-filter-related data F/P-001, F/P-002, F/P-003, F/P-004, and F/P-005, and 20 types of OCR score data IMG-1_F/P-001, IMG-1_F/P-002, . . . IMG-1_F/P-005, IMG-2_F/P-001, IMG-2_F/P-002, . . . , IMG-2_F/P-005, . . . , IMG-4_F/P-001, IMG-4_F/P-002, . . . , IMG-4_F/P-005.

As illustrated in FIG. 5, score values based on the 20 types of OCR score data IMG-1_F/P-001, IMG-1_F/P-002, . . . , IMG-1_F/P-005, IMG-2_F/P-001, IMG-2_F/P-002, . . . , IMG-2_F/P-005, . . . , IMG-4_F/P-001, IMG-4_F/P-002, . . . , IMG-4_F/P-005 may be 99, 60, . . . , 0, 70, 10, . . . , 11, . . . , 20, 91, . . . , 91 respectively.

As illustrated in FIG. 5, the probability that the article image data as the target of OCR is the same as the first article image data IMG-1 may be 9%, the probability that the article image data is the same as the second article image data IMG-2 may be 60%, the probability that the article image data is the same as the third article image data IMG-3 may be 30%, and the probability that the article image data is the same as the fourth article image data IMG-4 may be 1%.

In this case, as illustrated in FIG. 5, the first article image data IMG-1 has the highest score value of 99 points when image processing and OCR are performed with an image filter based on the first image-filter-related data F/P-001. The second article image data IMG-2 has the highest score value of 98 points when image processing and OCR are performed with an image filter based on the third image-filter-related data F/P-003. The third article image data IMG-3 has the highest score value of 100 points when image processing and OCR are performed with an image filter based on the second image-filter-related data F/P-002. The fourth article image data IMG-4 has the highest score value of 91 points when image processing and OCR are performed with an image filter based on the second image-filter-related data F/P-002 or the fifth image-filter-related data F/P-005.

For example, the trained model receiving, from the inference result data generator 330, a condition that the trained model outputs two types of inference result data with score values higher than or equal to 90 is described. In this case, the trained model first identifies a candidate for a combination of two types of image-filter-related data with the highest coverage ratio that indicates the percentage of the article image data IMG-1 to IMG-4 with a score value higher than or equal to 90 points when image processing and OCR are performed with the two types of image-filter-related data.

More specifically, with no combination of two types of image-filter-related data with a coverage ratio of 100%, the trained model calculates the first image-filter-related data F/P-001 and the second image-filter-related data F/P-002 with a coverage ratio of 75% as a first candidate, and the first image-filter-related data F/P-001 and the third image-filter-related data F/P-003 as a second candidate. When image processing and OCR are performed using the image filters based on the image-filter-related data F/P-001 and F/P-002 as the first candidate, the highest score values are 99 points for the first article image data IMG-1, 70 points for the second article image data IMG-2, 100 points for the third article image data IMG-3, and 91 points for the fourth article image data IMG-4. When image processing and OCR are performed using the image filters based on the image-filter-related data F/P-001 and F/P-003 as the second candidate, the highest score values are 99 points for the first article image data IMG-1, 98 points for the second article image data IMG-2, 91 points for the third article image data IMG-3, and 80 points for the fourth article image data IMG-4.

The trained model then calculates expected score values of the first and second candidates based on the probability of acquiring each piece of the article image data IMG-1 to IMG-4 on the actual production line, and outputs the candidate with the higher expected value as inference result data. More specifically, the expected score value of the first candidate is 81.82 points ($99 \times 0.09 + 70 \times 0.60 + 100 \times 0.30 + 91 \times 0.01 = 81.82$). The expected score value of the second candidate is 95.81 points ($99 \times 0.09 + 98 \times 0.60 + 91 \times 0.30 + 80 \times 0.01 = 95.81$). The trained model thus outputs the first image-filter-related data F/P-001 and the third image-filter-related data F/P-003 being the second candidate as the first inference result data and the second inference result data. The inference result data generator 330 thus generates the first image-filter-related data F/P-001 and the third image-filter-related data F/P-003 as the first inference result data and the second inference result data.

In the present embodiment, the inference result data generator 330 generates two types of inference result data, or the first inference result data and the second inference result data. In some embodiments, the inference result data generator 330 may generate three or more types of inference result data. For example, the inference result data generator 330 may generate three types of inference result data, or first inference result data, second inference result data, and third inference result data.

In this case, the trained model calculates the first image-filter-related data F/P-001, the second image-filter-related data F/P-002, and the third image-filter-related data F/P-003 with a coverage ratio of 100% as a first candidate, and the first image-filter-related data F/P-001, the third image-filter-related data F/P-003, and the fifth image-filter-related data F/P-005 as a second candidate. When image processing and OCR are performed using the image filters based on the image-filter-related data F/P-001, F/P-002, and F/P-003 as the first candidate, the highest score values are 99 points for the first article image data IMG-1, 98 points for the second article image data IMG-2, 100 points for the third article image data IMG-3, and 91 points for the fourth article image data IMG-4. When image processing and OCR are performed using the image filters based on the image-filter-related data F/P-001, F/P-003, and F/P-005 as the second candidate, the highest score values are 99 points for the first article image data IMG-1, 98 points for the second article image data IMG-2, and 91 points for the third article image data IMG-3 and the fourth article image data IMG-4.

The expected score value of the first candidate is 98.62 points ($99 \times 0.09 + 98 \times 0.60 + 100 \times 0.30 + 91 \times 0.01 = 98.62$). The expected score value of the second candidate is 95.92 points ($99 \times 0.09 + 98 \times 0.60 + 91 \times 0.30 + 91 \times 0.01 = 95.92$). In this case, the expected score value of the first candidate is higher than the expected score value of the second candidate when the probability of acquiring each piece of the article image data IMG-1 to IMG-4 changes. For example, when the probability of acquiring each piece of the article image data IMG-1 to IMG-4 is 25%, the first candidate has the expected score value of 97 points (($99+98+100+91$)/4=97) higher than the expected score value of the second candidate that is 94.75 points (($99+98+91+91$)/4=94.75). The trained model thus outputs the first image-filter-related data F/P-001, the second image-filter-related data F/P-002, and the third image-filter-related data F/P-003 being the first candidate as the first, second, and third inference result data. The inference result data generator 330 thus generates the first image-filter-related data F/P-001 as the first inference result data, the second image-filter-related data F/P-002 as the second inference result data, and the third image-filter-related data F/P-003 as the third inference result data.

The inference result data generator 330 may not provide the trained model with a condition that the score value is higher than or equal to 90 points. In this case as well, the trained model can output the first inference result data and the second inference result data by identifying a combination of image-filter-related data F/P-001 to F/P-005 with the highest expected score value.

The article image data as the target of OCR that is acquired by the article image data acquirer 320 may not include the data indicating the probability of the images being captured in an image on the actual production line. In this case, the inference result data generator 330 may identify a combination of the image-filter-related data F/P-001 to F/P-005 with the highest expected score value when the probabilities of acquiring the acquired article image data are identical.

Referring back to FIG. 2, the inference result data outputter 340 outputs the first inference result data and the second inference result data to the vision sensor 100 as the generated inference result data. In the vision sensor 100, the inference result data acquirer 190 acquires the first inference result data and the second inference result data. The image filter generator 130 generates a first image filter based on the first inference result data and a second image filter based on the second inference result data. The image filter outputter 140 outputs the first image filter and the second image filter to the image processor 150. The image processor 150 performs image processing of the article image data using each image filter. The OCR unit 160 performs OCR on the article image data that has undergone the image processing.

Trained Model Generation Process in Embodiment 1

Figure 6:
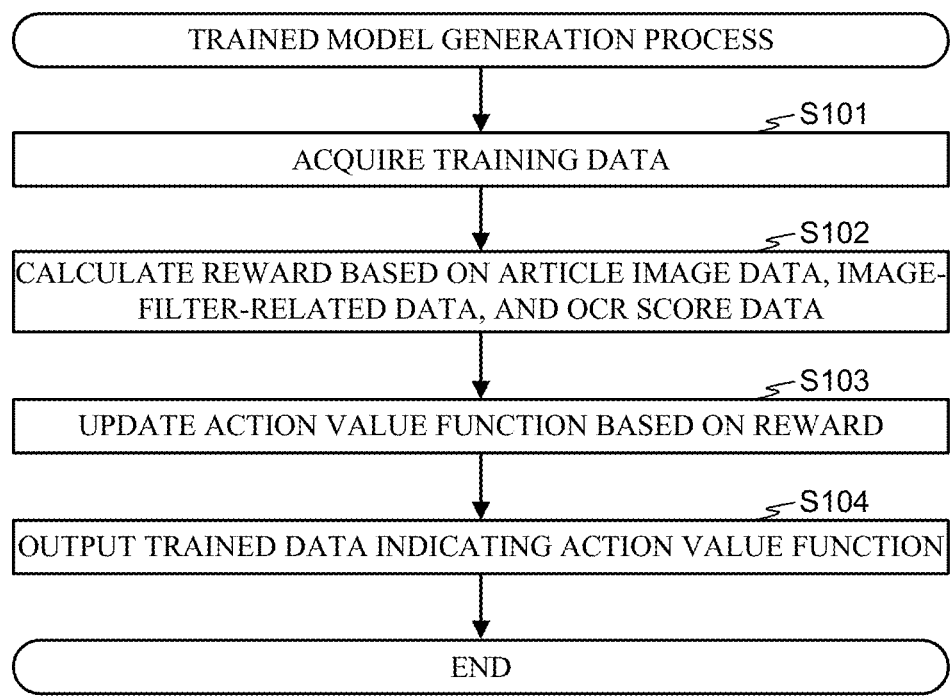
FIG. 6 is a flowchart of a trained model generation process in Embodiment 1.

An operation performed by the learning device 200 to generate and output a trained model is described with reference to a flowchart. The learning device 200 starts a trained model generation process illustrated in FIG. 6 when powered on. The training data acquirer 210 first acquires a new training data from the vision sensor 100 (step S101). For example, the training data acquirer 210 acquires, as training data, the data including the m types of article image data IMG-1, IMG-2, . . . , IMG-m, the n types of image-filter-related data F/P-001, F/P-002, . . . , F/P-00n, and the m×n types of OCR score data IMG-1_F/P-001, IMG-1_F/P-002, . . . , IMG-1_F/P-00n, IMG-2_F/P-001, IMG-2_F/P-002, . . . , IMG-2_F/P-00n, . . . , IMG-m_F/P-001, IMG-m_F/P-002, . . . , IMG-m_F/P-00n illustrated in FIG. 4.

The trained model generator 220 then generates a trained model through machine learning using the acquired multiple types of training data. More specifically, the reward calculator 221 calculates a reward $r_{t+1}$ based on the article image data, the image-filter-related data, and the OCR score data included in the acquired training data (step S102). For example, for the first article image data IMG-1, the reward calculator 221 provides a reward of +1 when the image-filter-related data changes from F/P-001 to F/P-002 and (SC2−SC1)>0, and provides a reward of −1 when (SC2−SC1)≤0.

The value function updater 222 then updates the action value function $Q(s_t, a_t)$ based on the calculated reward $r_{t+1}$ (step S103). For example, the value function updater 222 calculates the state $s_t$ from a numerical value x indicating the article image data and the action $a_t$ from a numerical value y indicating the image-filter-related data. The value function updater 222 updates the action value function $Q(s_t, a_t)$ with the update formula expressed in Formula 1 above. The trained model generator 220 outputs the trained model that is the data indicating the updated action value function $Q(s_t, a_t)$ to the storage device 400 and stores the trained model into the trained model storage 410 (step S104), and ends the process.

Inference Result Data Generation Process in Embodiment 1

Figure 7:
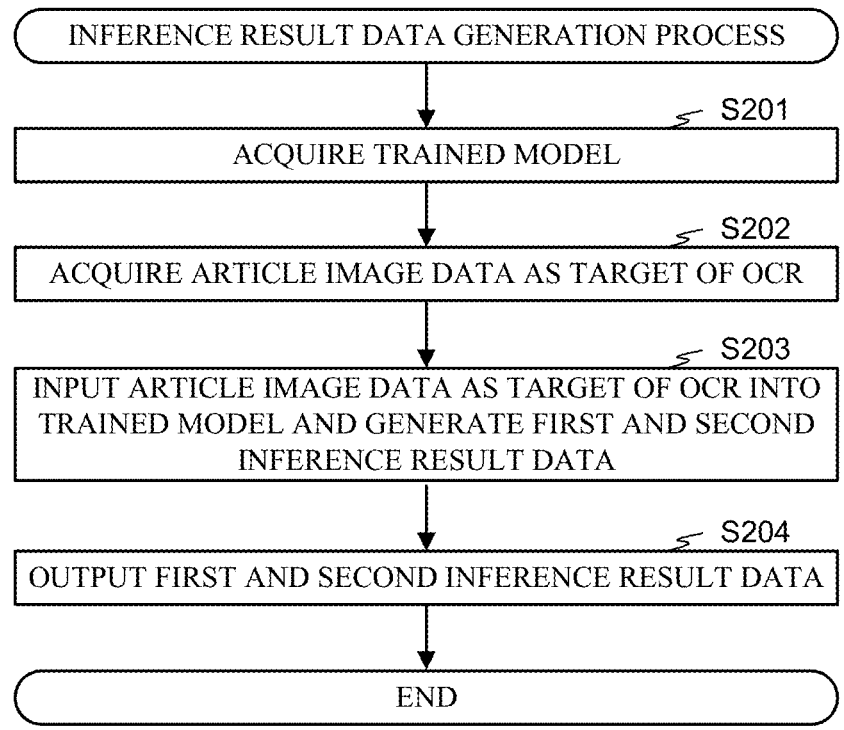
FIG. 7 is a flowchart of an inference result data generation process in Embodiment 1.

An operation performed by the inference device 300 to generate and output inference result data is described with reference to a flowchart. The inference device 300 starts an inference result data generation process illustrated in FIG. 7 when powered on. The trained model acquirer 310 first acquires a trained model stored in the storage device 400 (step S201). The article image data acquirer 320 then acquires article image data as a new target of OCR from the vision sensor 100 (step S202). The inference result data generator 330 inputs the article image data as the new target of OCR into the trained model and generates first inference result data and second inference result data (step S203). The inference result data outputter 340 outputs the generated first inference result data and second inference result data to the vision sensor 100 (step S204), and ends the process.

Image Filter Generation Process in Embodiment 1

Figure 8:
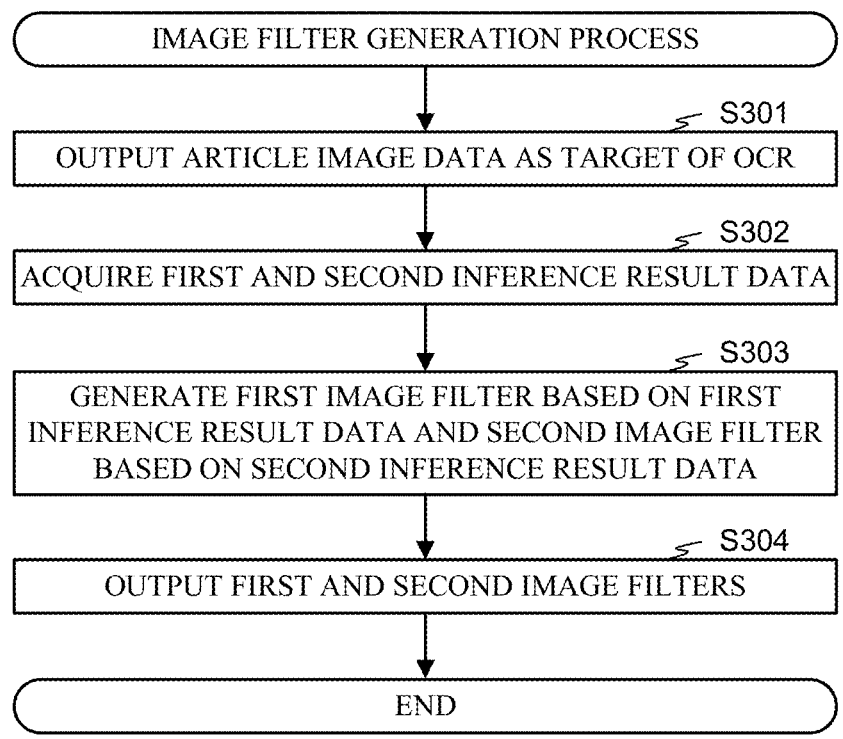
FIG. 8 is a flowchart of an image filter generation process in Embodiment 1.

An operation performed by the vision sensor 100 to generate and output an image filter is described with reference to a flowchart. The vision sensor 100 starts an image filter generation process illustrated in FIG. 8 when powered on. The article image data outputter 170 first outputs article image data as the target of OCR to the inference device 300 (step S301). The inference result data acquirer 190 then acquires first inference result data and second inference result data output from the inference device 300 (step S302). The image filter generator 130 then generates a first image filter based on the first inference result data and a second image filter based on the second inference result data (step S303). The image filter outputter 140 then outputs the first image filter and the second image filter to the image processor 150 (step S304), and ends the process.

As described above, in the image filter generation system 1 according to the present embodiment, the vision sensor 100 generates image filters usable for image processing to be performed before performance of OCR on the article image data acquired by the camera 110 performing image capturing of the article.

For example, OCR performed on image data of a workpiece captured in an image with a vision sensor in a factory is described. In this case, image capturing a workpiece is performed when, for example, the workpiece is not in position or the lighting inside the factory is too bright or too dark may provide article image data that does not allow easy character recognition and may cause misrecognition of characters. Engineers have manually conducted trials such as combining various image filters and setting the parameters of the image filters based on the know-how, prepared several types of image filters with high OCR reliability in specific environments in advance, and applied the image filter with the highest OCR score in the current environment. However, image filters are to be prepared based on all the types of workpieces such as the materials, colors, and shapes of the workpieces, the types of image filters to be combined, and parameters. Manually preparing and applying image filters are thus time-consuming.

In the image filter generation system 1 according to the present embodiment, the vision sensor 100 automatically generates image filters based on all the types of workpieces indicated by the article image data, the types of image filters to be combined, and parameters indicated by the image-filter-related data.

The image filter generation system 1 according to the present embodiment thus uses a shorter time than manually preparing and applying image filters from when the article image data as the target of OCR is acquired to when image processing is performed using the image filter.

In the image filter generation system 1 according to the present embodiment, the learning device 200 includes the training data acquirer 210 that acquires, from the vision sensor 100, training data including article image data and image-filter-related data. The trained model generator 220 generates a trained model indicating the relationship between the article image data and the image-filter-related data through machine learning using the training data. The trained model outputter 230 outputs the trained model to the storage device 400 and stores the trained model into the storage device 400.

The inference device 300 includes the article image data acquirer 320 that acquires article image data as the target of OCR. The inference result data generator 330 inputs article image data as the target of OCR into a trained model acquired from the storage device 400 by the trained model acquirer 310 and generates first and second inference result data. The inference result data outputter 340 outputs the first inference result data and the second inference result data to the vision sensor 100. In the vision sensor 100, the image filter generator 130 generates a first image filter based on the first inference result data and a second image filter based on the second inference result data. The image filter outputter 140 outputs the first image filter and the second image filter.

In the vision sensor 100, the image processor 150 can perform image processing of the article image data using the first image filter, and can also perform image processing of the article image data using the second image filter. The OCR unit 160 can perform OCR on the article image data that has undergone image processing using the first image filter, and can also perform OCR on the article image data that has undergone image processing using the second image filter.

Figure 9:
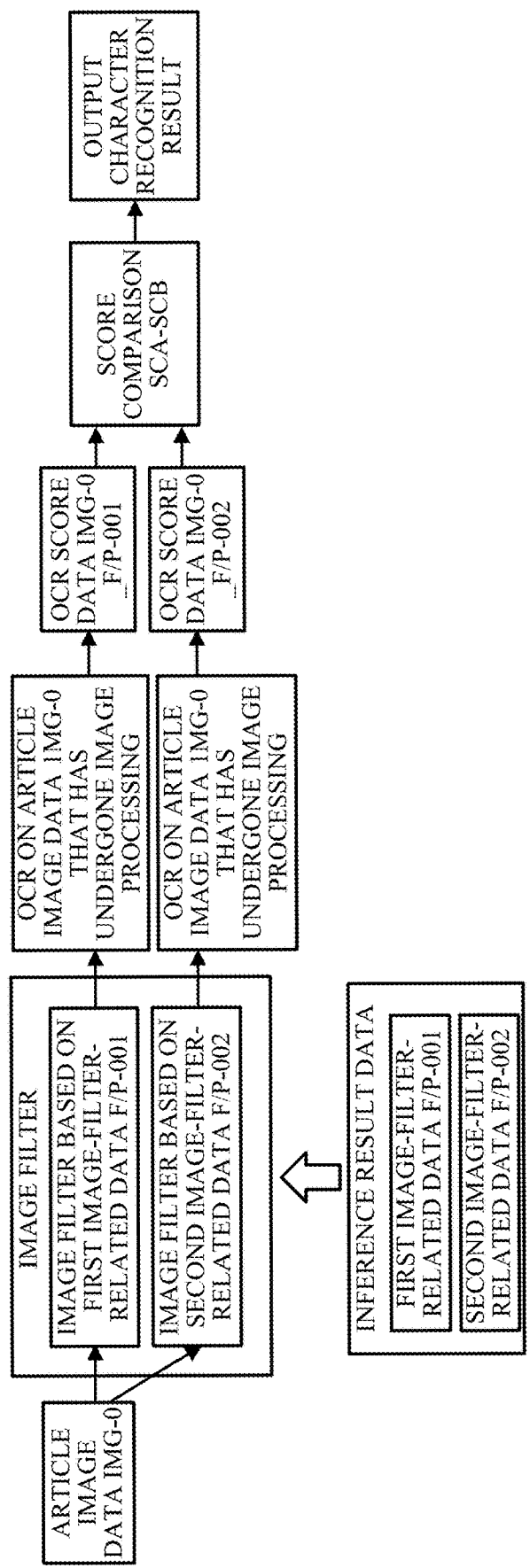
FIG. 9 is a diagram describing the operation of the image filter generation system according to Embodiment 1.

For example, as illustrated in FIG. 9, article image data as a new target of OCR is denoted with IMG-0, the first inference result data generated and output by the inference device 300 is denoted with F/P-001, and the second inference result data is denoted with F/P-002. In this case, the vision sensor 100 generates a first image filter based on the first inference result data F/P-001 and a second image filter based on the second inference result data F/P-002. The vision sensor 100 also performs image processing and OCR on the article image data IMG-0 using each image filter. Each OCR score data to be output is denoted with IMG-0_F/P-001 and IMG-0_F/P-002. The score values based on the OCR score data IMG-0_F/P-001 and IMG-0_F/P-002 are denoted with SCA and SCB. In this case, when (SCA−SCB)>0 is satisfied, the vision sensor 100 uses a character recognition result acquired by performing image processing and OCR using the first image filter, whereas when (SCA−SCB)≤0 is satisfied, the vision sensor 100 uses a character recognition result acquired by performing image processing and OCR using the second image filter.

In this manner, the vision sensor 100 can select, of the first image filter and the second image filter, the image filter with the highest character recognition score when performing OCR. Thus, the vision sensor 100 can select, within the tact time from when the camera 110 performs image capturing of a workpiece to when OCR is performed, an image filter that is optimum for article image data as the target of OCR every time the camera 110 performs image capturing of a workpiece, and perform image processing and OCR using the image filter. The image filter generation system 1 according to the present embodiment can thus reduce misrecognition of characters more than an image filter generation system in which an inference device does not generate first nor second inference result data.

In the present embodiment, the inference device 300 generates and outputs two types of inference result data. In some embodiments, the inference device 300 may generate and output three or more types of inference result data. For example, when the inference device 300 generates and outputs three types of inference result data, the vision sensor 100 can select, of first, second, and third image filters, the image filter with the highest character recognition score when performing OCR. In this case, image processing and trial OCR using image filters based on the three types of inference result data are to be performed within the tact time described above. Thus, when the inference device 300 generates and outputs three or more types of inference result data, the number of types of inference result data is to be determined based on the takt time.

In the image filter generation system 1 according to the present embodiment, the training data acquirer 210 acquires training data including (i) article image data, (ii) image-filter-related data, and (iii) OCR score data. The trained model generator 220 generates a trained model indicating the relationship between the article image data, the image-filter-related data, and the OCR score data through machine learning using the training data.

The inference device 300 can thus generate and output inference result data that is inferred to have the highest character recognition score output when performing OCR by inputting article image data as the target of OCR into the trained model. The image filter generation system 1 according to the present embodiment can thus reduce misrecognition of characters more than an image filter generation system in which a learning device does not generate a trained model indicating the relationship between article image data, image-filter-related data, and OCR score data.

In the image filter generation system 1 according to the present embodiment, the learning device 200 includes the trained model generator 220 that performs reinforcement learning using the action value function $Q(s_t, a_t)$ as machine learning. The trained model generator 220 updates the action value function $Q(s_t, a_t)$ by, in response to a change in at least one of the article image data or the image-filter-related data in the two types of training data, increasing the reward $r_{t+1}$ when the score indicated by the OCR score data increases due to the change, and decreasing the reward $r_{t+1}$ when the score decreases due to the change. The trained model generator 220 then generates data indicating the updated action value function $Q(s_t, a_t)$ as a trained model.

The inference device 300 can thus generate and output inference result data that is inferred to have the highest character recognition score output when performing OCR by inputting article image data as the target of OCR into the trained model that has been trained through reinforcement learning based on the score indicated by the OCR score data. The image filter generation system 1 according to the present embodiment can thus reduce misrecognition of characters more than an image filter generation system in which a learning device does not generate a trained model that has been trained through reinforcement learning based on the score indicated by the OCR score data.

In the image filter generation system 1 according to the present embodiment, article image data included in the training data includes article image data of a workpiece actually captured in an image at a time during past manufacture.

The image filter generation system 1 according to the present embodiment can thus reduce misrecognition of characters when OCR is performed on article image data of a workpiece during actual manufacture more than an image filter generation system that does not generate a trained model through machine learning using training data including article image data of a workpiece actually captured in an image at a time during past manufacture.

In the image filter generation system 1 according to the present embodiment, the article image data included in the training data includes article image data of a workpiece captured in an image in a pseudo environment simulating an actual environment.

The image filter generation system 1 according to the present embodiment can thus reduce misrecognition of characters when OCR is performed on article image data of a workpiece during actual manufacture more than an image filter generation system that does not generate a trained model through machine learning using training data including article image data of a workpiece captured in an image in a pseudo environment.

Embodiment 2

Although the inference device 300 generates and outputs multiple types of inference result data in Embodiment 1, the inference device 300 may not generate and output multiple types of inference result data. In an image filter generation system 1 according to Embodiment 2, an inference device 300 simply generates and outputs one type of inference result data. The image filter generation system 1 according to Embodiment 2 is described in detail with reference to FIGS. 2, 5, 10, and 11. In Embodiment 2, components different from those in Embodiment 1 are described, and the same components as in Embodiment 1 are not described to avoid redundancy.

Details of Functional Components of Inference Device 300 According to Embodiment 2

Referring back to FIG. 2, an article image data acquirer 320 in Embodiment 2 acquires article image data as the target of OCR that is output from a vision sensor 100. In the present embodiment, the article image data as the target of OCR that is acquired by the article image data acquirer 320 is the article image data of a workpiece captured in an image on the actual production line when the vision sensor 100 performs OCR.

An inference result data generator 330 in Embodiment 2 inputs the article image data as the target of OCR into a trained model and generates inference result data.

An inference result data outputter 340 in Embodiment 2 outputs the generated inference result data to the vision sensor 100.

An overview of a process in which the trained model that has received the article image data as the target of OCR outputs the inference result data is described. As illustrated in FIG. 5, the first article image data IMG-1 has the highest score value of 99 points when image processing and OCR are performed with an image filter based on the first image-filter-related data F/P-001. The second article image data IMG-2 has the highest score value of 98 points when image processing and OCR are performed with an image filter based on the third image-filter-related data F/P-003. The third article image data IMG-3 has the highest score value of 100 points when image processing and OCR are performed with an image filter based on the second image-filter-related data F/P-002. The fourth article image data IMG-4 has the highest score value of 91 points when image processing and OCR are performed with an image filter based on the second image-filter-related data F/P-002 or the fifth image-filter-related data F/P-005.

Thus, for example, when the article image data IMG-0 as the target of OCR is most approximate to the first article image data IMG-1, the trained model outputs the first image-filter-related data F/P-001 as the inference result data. When the article image data IMG-0 as the target of OCR is most approximate to the second article image data IMG-2, the trained model outputs the third image-filter-related data F/P-003 as the inference result data. The trained model outputs the second image-filter-related data F/P-002 as the inference result data when the article image data IMG-0 as the target of OCR is most approximate to the third article image data IMG-3. When the article image data IMG-0 as the target of OCR is most approximate to the second article image data IMG-2, the trained model outputs the second image-filter-related data F/P-002 or the fifth image-filter-related data F/P-005 as the inference result data. The inference result data generator 330 thus generates any of the image-filter-related data F/P-001, F/P-002, F/P-003, and F/P-005 described above as the inference result data.

Inference Result Data Generation Process in Embodiment 2

Figure 10:
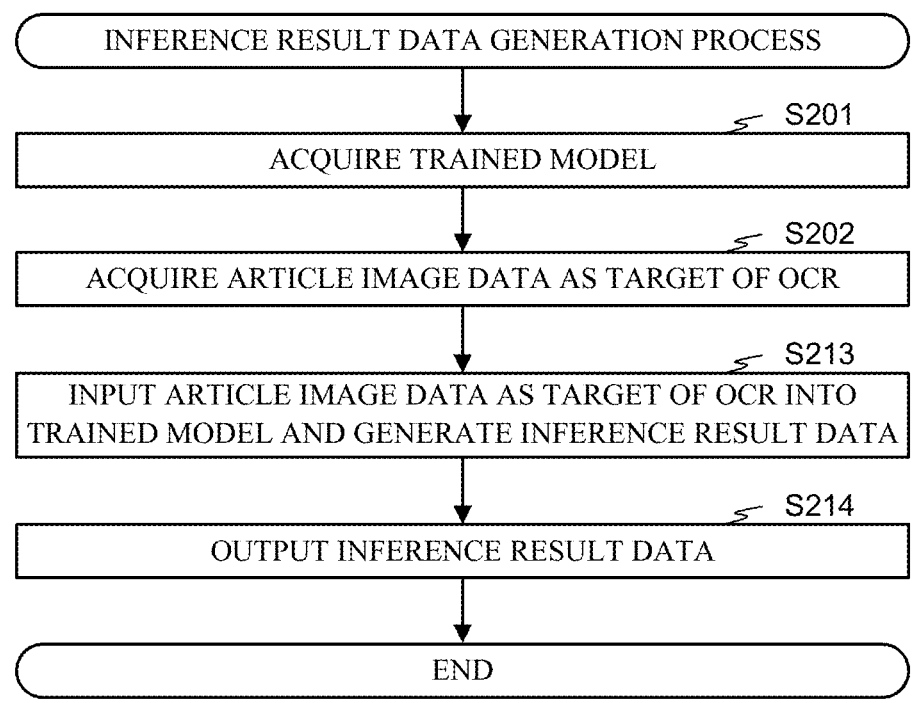
FIG. 10 is a flowchart of an inference result data generation process in Embodiment 2.

An operation performed by the inference device 300 to generate and output inference result data is described with reference to a flowchart. As illustrated in FIG. 10, after the processing in steps S201 and 202 is performed, the inference result data generator 330 inputs the article image data as the new target of OCR into the trained model and generates inference result data (step S213). The inference result data outputter 340 outputs the generated inference result data (step S214), and ends the process.

Image Filter Generation Process in Embodiment 2

Figure 11:
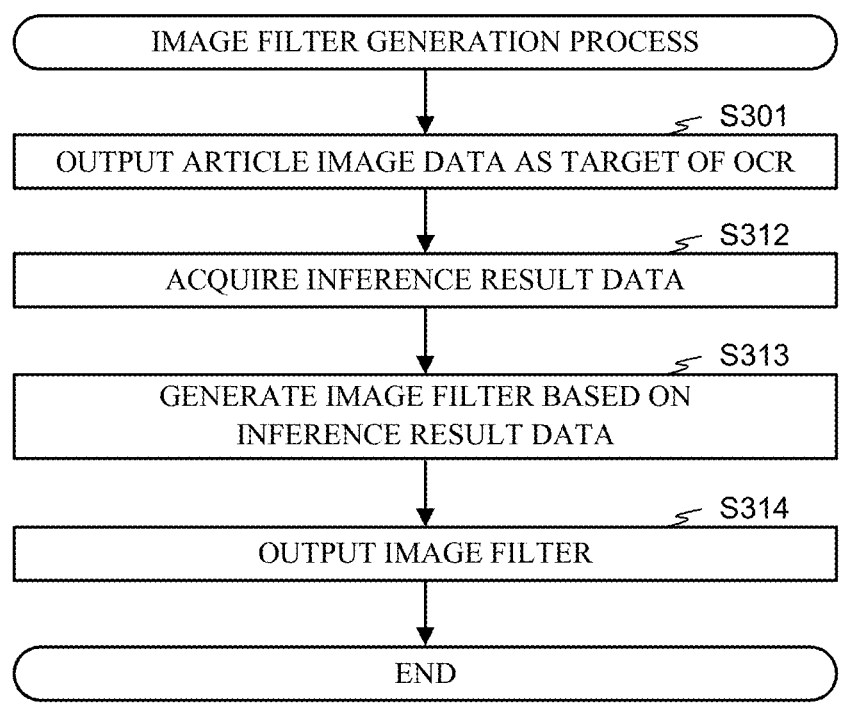
FIG. 11 is a flowchart of an image filter generation process in Embodiment 2.

An operation performed by the vision sensor 100 to generate and output an image filter is described with reference to a flowchart. As illustrated in FIG. 11, after the processing in step S301 is performed, the inference result data acquirer 190 acquires the inference result data output from the inference device 300 (step S312). An image filter generator 130 then generates an image filter based on the acquired inference result data (step S313). An image filter outputter 140 then outputs the generated image filter to an image processor 150 (step S314), and ends the process.

As described above, in the image filter generation system 1 according to the present embodiment, the inference device 300 includes the inference result data generator 330 that inputs article image data as the target of OCR into a trained model and generates inference result data. The vision sensor 100 includes the image filter generator 130 that generates an image filter based on the inference result data. The image filter outputter 140 outputs the image filter. The image processor 150 performs image processing of the article image data using the image filter. An OCR unit 160 performs OCR on the article image data that has undergone image processing using the image filter.

The vision sensor 100 can thus perform image processing of the article image data using the image filter inferred by the trained model to have the highest character recognition score when OCR is performed. For example, the vision sensor 100 generates an image filter based on the inference result data F/P-001, and performs, using the image filter, image processing and OCR on the article image data IMG-0 of a workpiece that is captured in an image on the actual production line when the operation of OCR is performed. Thus, unlike in Embodiment 1, image processing and OCR may not be performed using two types of image filters to use a character recognition result with a higher score value. The vision sensor 100 can thus acquire, from the inference device 300, inference result data that is optimum for article image data as the target of OCR every time the camera 110 performs image capturing of a workpiece, and perform image processing and OCR using the image filter based on the inference result data.

The image filter generation system 1 according to the present embodiment produces the same advantageous effects as the image filter generation system 1 according to Embodiment 1.

Embodiment 3

The vision sensor 100, the learning device 200, the inference device 300, and the storage device 400 are separate devices in Embodiments 1 and 2, but may be integral. For example, the vision sensor 100 being an image filter generation device may have the functions of the other devices 200, 300, and 400. A vision sensor 100 according to Embodiment 3 has all the functions of the learning device 200, the inference device 300, and the storage device 400. The vision sensor 100 according to Embodiment 3 is described below in detail with reference to FIG. 12. In Embodiment 3, components different from Embodiments 1 and 2 are described, and the same components as in Embodiments 1 and 2 are not described to avoid redundancy.

Vision Sensor 100 According to Embodiment 3

Figure 12:
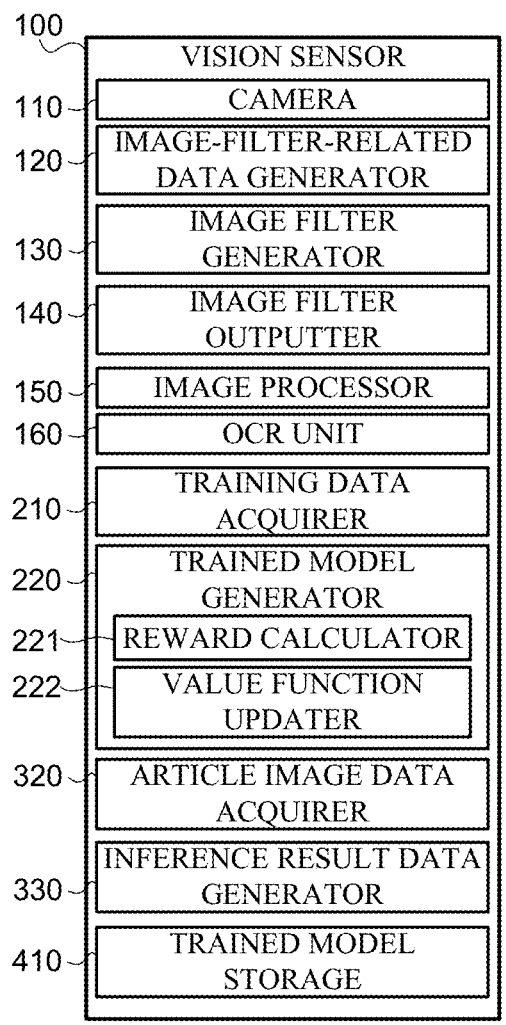
FIG. 12 is a functional block diagram of a vision sensor according to Embodiment 3.

As illustrated in FIG. 12, the vision sensor 100 does not include the article image data outputter 170, the training data outputter 180, or the inference result data acquirer 190. The vision sensor 100 further includes a training data acquirer 210, a trained model generator 220, a reward calculator 221, a value function updater 222, an article image data acquirer 320, an inference result data generator 330, and a trained model storage 410. A trained model acquirer 310 acquires a trained model stored in the trained model storage 410. The article image data acquirer 320 acquires article image data as the target of OCR from a camera 110.

As described above, the vision sensor 100 according to the present embodiment can perform the functions of the learning device 200, the inference device 300, and the storage device 400 in Embodiments 1 and 2.

This allows the vision sensor 100 according to the present embodiment to produce the same advantageous effects as the image filter generation system 1 according to Embodiments 1 and 2.

Modifications

The devices 100, 200, 300, and 400 in Embodiments 1 and 2 are integral in Embodiment 3, but the combination of the devices to be integral is not limited to the above. For example, the learning device 200 and the storage device 400 in Embodiments 1 and 2 may be integral, and the other devices 100 and 300 may be separate devices. The inference device 300 and the storage device 400 in Embodiments 1 and 2 may be integral, and the other devices 100 and 200 may be separate devices. For example, the learning device 200, the inference device 300, and the storage device 400 in Embodiments 1 and 2 may be integral, and the vision sensor 100 alone may be a separate device.

In Embodiments 1 and 2, the vision sensor 100, the learning device 200, the inference device 300, and the storage device 400 can transmit and receive data through the LAN, but may transmit and receive data with other methods. For example, the vision sensor 100, the learning device 200, the inference device 300, and the storage device 400 may transmit and receive data through a communication cable with which the vision sensor 100, the learning device 200, the inference device 300, and the storage device 400 are connected to one another, or may transmit and receive data through the Internet. For example, the learning device 200, the inference device 300, and the storage device 400 may serve as a cloud server. In this case, the cloud server may generate and store a trained model through machine learning using training data acquired from the vision sensor 100. In this case, the cloud server may input the article image data as the target of OCR that is newly acquired from the vision sensor 100 into the trained model, generate inference result data, and output the data to the vision sensor 100.

In Embodiments 1 to 3, the trained model generator 220 generates a trained model through Q-learning as an example of a reinforcement learning algorithm. In some embodiments, the trained model generator 220 may generate a trained model using another reinforcement learning algorithm. For example, the trained model generator 220 may generate a trained model through temporal difference learning (TD-learning).

In Embodiments 1 to 3, the trained model generator 220 generates a trained model with a reinforcement learning algorithm. In some embodiments, the trained model generator 220 may generate a trained model with a known algorithm, such as deep learning, a neural network, genetic programming, functional logic programming, or a support-vector machine. The learning method is also not limited to reinforcement learning. For example, the trained model generator 220 may generate a trained model with a known algorithm for a different type of learning, such as supervised, unsupervised, or semi-unsupervised learning.

When the trained model generator 220 generates the trained model with supervised learning, the training data is to include, for example, true data indicating the correct characters to be recognized in the article image data that has undergone trial OCR. The true data may be manually input in advance, or may be automatically input based on the results of comparing character strings recognized by performing OCR on multiple sets of article image data.

When the trained model generator 220 generates the trained model with unsupervised learning, the training data is to include, for example, classification data for classifying each set of article image data as the target of image processing, such as article image data of a workpiece on which characters are blurred, article image data of a workpiece captured in an image in a bright room, and article image data of a workpiece captured in an image in a dark room. The image-filter-related data included in the training data is to be, for example, image-filter-related data of an image filter usable for image processing of the article image data in each classification, and such image-filter-related data is to be selected in advance.

When the trained model generator 220 generates the trained model with semi-unsupervised learning, the training set is to include, for example, the classification data and the true data described above.

In Embodiments 1 and 2, the learning device 200 acquires training data from the vision sensor 100 included in the image filter generation system 1. In Embodiment 3, the vision sensor 100 generates and acquires the training data. In some embodiments, for example, the learning device 200 and the vision sensor 100 may acquire the training data from other devices or systems that perform OCR. The learning device 200 and the vision sensor 100 may acquire the training data from, for example, multiple image filter generation systems operating in the same area, or from an image filter generation system operating independently in a different area. In this case, the learning device 200 and the vision sensor 100 may add or remove other image filter generation systems to acquire the training data at any time.

In Embodiments 1 and 2, the learning device 200 preinstalled in the image filter generation system 1 simply performs machine learning on the training data acquired from the vision sensor 100 to generate and output a trained model. In some embodiments, for example, the learning device 200 in the image filter generation system 1 may be a learning device installed in another image filter generation system that has acquired training data from the vision sensor and performed machine learning. The trained model may be updated and output through performing re-learning by acquiring training data from the vision sensor 100.

In Embodiments 1 and 2, the inference device 300 acquires the trained model generated and output by the learning device 200 installed in the image filter generation system 1 and stored in the storage device 400. In some embodiments, for example, the inference device 300 may acquire a trained model generated and output by another image filter generator or another image filter generation system.

The main components that perform the processing of the vision sensor 100, the learning device 200, and the inference device 300 including the controller 51, the main storage 52, the external storage 53, the operation device 54, the transmitter-receiver 56, and the internal bus 50 can be implemented with a common computer system, rather than with a dedicated system. For example, a computer program for performing the above operations may be stored in a non-transitory computer-readable recording medium, such as a flexible disk or a digital versatile disc read-only memory (DVD-ROM), distributed, and installed on a computer to implement the vision sensor 100, the learning device 200, and the inference device 300 that perform the above processing. In some embodiments, the computer program may be stored in a storage device included in a server device on a communication network and downloaded to a common computer system to implement the vision sensor 100, the learning device 200, and the inference device 300.

In the system with the above functions of the vision sensor 100, the learning device 200, and the inference device 300 implementable partially by the operating system (OS) and an application program or through cooperation between the OS and the application program, portions executable by the application program other than the OS may be stored in a non-transitory recording medium or a storage device.

The computer program may be superimposed on a carrier wave to be provided with a communication network. For example, the computer program may be posted on a bulletin board system (BBS) on a communication network, and provided through the network. The computer program may be activated and executed under the control of the OS in the same manner as another application program to perform the above processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Image filter generation system
50 Internal bus
51 Controller
52 Main storage
53 External storage
54 Operation device
55 Display
56 Transmitter-receiver
59 Control program
100 Vision sensor
110 Camera
120 Image-filter-related data generator
130 Image filter generator
140 Image filter outputter
150 Image processor
160 OCR unit
170 Article image data outputter
180 Training data outputter
190 Inference result data acquirer
200 Learning device
210 Training data acquirer
220 Trained model generator
221 Reward calculator
222 Value function updater
230 Trained model outputter
300 Inference device
310 Trained model acquirer
320 Article image data acquirer
330 Inference result data generator
340 Inference result data outputter
400 Storage device
410 Trained model storage

The invention claimed is:

1. An inference device for inferring image filters usable for image processing to be performed before performance of OCR on article image data that is data of an image of an article captured by an imaging component, the OCR being optical character recognition, the inference device comprising:

article image data acquiring circuitry to acquire the article image data as a target of the OCR;
inference result data generating circuitry to generate, by inputting the article image data as the target of the OCR into a trained model, inference result data indicating a combination of a plurality of image filters usable for image processing of the article image data as the target of the OCR and a value of a parameter for each of the plurality of image filters, the trained model being generated through machine learning using training data including (i) the article image data acquired in advance, (ii) image-filter-related data indicating a combination of a plurality of image filters used for image processing of the article image data and a value of a parameter for each of the plurality of image filters, and (iii) OCR score data indicating a score of character recognition output through the OCR when image processing is performed on the article image data using the image filters based on the image-filter-related data, the inference result data generating circuitry being to generate first inference result data as the inference result data and second inference result data as the inference result data different from the first inference result data; and
inference result data outputting circuitry to output the first inference result data and the second inference result data.

2. An inference method for inferring image filters usable for image processing to be performed before performance of OCR on article image data that is data of an image of an article captured by an imaging component, the OCR being optical character recognition, the inference method comprising:

acquiring, by a computer, the article image data as a target of the OCR;
generating, by the computer, by inputting the article image data as the target of the OCR into a trained model, inference result data indicating a combination of a plurality of image filters usable for image processing of the article image data as the target of the OCR and a value of a parameter for each of the plurality of image filters, the trained model being generated through machine learning using training data including (i) the article image data acquired in advance, (ii) image-filter-related data indicating a combination of a plurality of image filters used for image processing of the article image data and a value of a parameter for each of the plurality of image filters, and (iii) OCR score data indicating a score of character recognition output through the OCR when image processing is performed on the article image data using the image filters based on the image-filter-related data, wherein first inference result data is generated as the inference result data and second inference result data is generated as the inference result data different from the first inference result data; and outputting the first inference result data and the second inference result data.

3. A non-transitory computer-readable recording medium storing a program for causing a computer to execute processing, the processing comprising:

acquiring article image data that is data of an image of an article captured by an imaging component to perform OCR that is optical character recognition;

generating, by inputting the article image data as a target of the OCR into a trained model, inference result data indicating a combination of a plurality of image filters usable for image processing of the article image data as the target of the OCR and a value of a parameter for each of the plurality of image filters, the trained model being generated through machine learning using training data including (i) the article image data acquired in advance, (ii) image-filter-related data indicating a combination of a plurality of image filters used for image processing performed before performance of the OCR on article image data and a value of a parameter for each of the plurality of image filters, and (iii) OCR score data indicating a score of character recognition output through the OCR when image processing is performed on the article image data using the image filters based on the image-filter-related data, wherein first inference result data is generated as the inference result data and second inference result data is generated as the inference result data different from the first inference result data; and outputting the first inference result data and the second inference result data.

\* \* \* \* \*